United States Patent
Kunze

[19]

[11] Patent Number: 5,778,652
[45] Date of Patent: Jul. 14, 1998

[54] CABLE WITH A SHEATH MADE OF STEEL, AND A METHOD AND APPARATUS FOR FORMING THE CABLE

[75] Inventor: Dieter Kunze, Neuried, Germany

[73] Assignee: Siemens Aktiengesellschaft, Munich, Germany

[21] Appl. No.: 672,040

[22] Filed: Jun. 26, 1996

[30] Foreign Application Priority Data

Jul. 12, 1995 [DE] Germany ............... 195 25 422.8

[51] Int. Cl.$^6$ .................................. D02G 3/06
[52] U.S. Cl. .................. 57/235; 57/31; 57/260; 174/102 R; 174/107
[58] Field of Search ................. 57/210, 212, 235, 57/31, 32, 260; 174/102 R, 102 D, 103, 106 D, 107; 29/463, 429, 430, 779, 781, 782

[56] References Cited

U.S. PATENT DOCUMENTS

| 275,407 | 4/1883 | Philips et al. ............ 174/102 R |
|---|---|---|
| 3,260,636 | 7/1966 | Witzenmann ............ 174/102 R |
| 4,232,935 | 11/1980 | Rohner et al. ............ 350/96.23 |
| 4,395,810 | 8/1983 | Tsuzawa et al. ............ 29/463 |
| 5,111,002 | 5/1992 | Hollander ............ 174/107 |

FOREIGN PATENT DOCUMENTS

| 724677 | 9/1942 | Germany ............ 174/106 D |
|---|---|---|
| 1198885 | 8/1965 | Germany ............ 174/102 |
| 29 13 055 | 10/1980 | Germany . |
| 4-162308 | 6/1992 | Japan ............ 174/102 R |
| 83/01337 | 4/1983 | WIPO ............ 174/102 R |

*Primary Examiner*—William Stryjewski
*Attorney, Agent, or Firm*—Hill & Simpson

[57] ABSTRACT

A metal sheath for surrounding a cable core consists of at least one shell part which is formed from a spring-hard steel strip. The shell part is formed by a method of bending a spring-hard steel strip into a shell having a transverse cross-section of at least a semi-circle so that after release, the shell springs back to the desired diameter for receiving the cable core.

11 Claims, 2 Drawing Sheets

CABLE WITH A SHEATH MADE OF STEEL, AND A METHOD AND APPARATUS FOR FORMING THE CABLE

BACKGROUND OF THE INVENTION

The present invention is directed to a cable, in particular a cable supported aboveground such as an air cable having a sheath which is made of steel in the form of a tube surrounding the cable core.

A cable having a steel tube which was formed from a flat strip whose edges were welded together and subsequently was formed into a corrugated sheath is disclosed in U.S. Pat. No. 4,232,935 whose disclosure is incorporated by reference thereto and which claims priority from German application 27 43 260. To form this cable which has optical waveguides or other conductors disposed in the interior of the metal tube, the manufacturing process can only be carried out with very soft, easily workable steels.

An electrical and/or optical cable is known from a German published application 29 13 055 and comprises a diffusion-inhibiting layer made of a metal foil coated on both sides with plastic. Thin foils of this type are also not suited to accept larger loads.

Cables are often required, whose sheath can withstand very strong loads, in particular either tension stresses or punctiform loads. This is particular for aboveground cables where strength against the impact of debris is usually also required. For underground cables, protection against rodents is an important consideration.

SUMMARY OF THE INVENTION

The object of the present invention is to create a cable of a simple manufacture whose sheath is made of steel and is capable of handling the particular loads made on the cable core. This object is solved in that the cable is provided with a sheath consisting of at least one shell part made of spring-hard steel.

The basic material of the shell parts is inexpensively available in the form of spring steel strip material. The manufacturing process relies on a brief exceeding of the limit of elasticity of the spring steel and is simple to carry out wherein the dimensioning only of the elastic expansion usually for spring parts of this type need be watched. The inventive cable is particularly resistant to external mechanical loads, and yields a good protection for the cable core which is of a particular importance for light waveguide cable.

The invention also is directed to a method for the manufacturing of the inventive cable which method is characterized in that at least one spring-hard steel strip is drawn from at least one supply coil, and is supplied respectively to at least one forming nozzle through which it is bent transverse to a longitudinal extending axis of the strip into a shell, and in that the steel strip is thereby bent in excess so far that after an elastic expansion, the desired inner diameter is obtained.

The invention is also directed to an apparatus or means for carrying out the above forming method which includes means for supporting a supply coil with a spring-hard steel strip, at least one forming nozzle serving for the formation of the shell for each steel strip and a guide nozzle is provided to attach the formed steel strip onto a cable core.

Other advantages and features of the invention will be readily apparent from the following description of the preferred embodiments, the drawings and claims.

DESCRIPTION OF THE PREFERRED EMBODIMENTS

The present invention are particularly useful when incorporating in a cable CA1 (FIG. 1) such as a communication cable comprising a deposited outer coating MA having one or several layers, as well as a cable core CS. In the present example, the cable core CS contains a protective sheath SH, made of plastic, which may be either one layer or multiple layers and in whose interior is provided preferably loose light waveguides LW1 and LW2. The light waveguides LW1 and LW2 can also be embedded in a filling mass. It is possible to provide only one, or more than two, light waveguides in the interior of the cable core CS, and to bundle these correspondingly, if warranted for example or a mini- or maxi-bundle. It is also possible for the light waveguide to be in a strip conductor or the like.

In place of, or in addition to, optical transmission elements, electrical leads can also be provided in the interior of the cable core CS. These electrical leads can be the leads for an electrical telephone cable.

Between the outer coating MA, which is usually made of plastic, and the cable core CS, a tubular metallic sheath is provided, which is made of a shell part MS1 in the present example. The shell part MS1 is bent in a C-shape, so that the lateral edges are oriented approximately so as to abut on one another. If particularly high diffusion blocking values should be required, an additional sealing of the gap can be provided, i.e. through the application of a thin metal foil or the like. A welding of the edges together is in general not necessary and also not useful.

The shell part MS1, which yields the tubular sheath for the cable core, is made of a spring-hard steel, wherein the steel has a limit of elasticity that lies above $600 N/mm^2$. Preferably the elastic limit is above $1000 N/mm^2$, which is particularly suited for this purpose.

In the following, a spring-hard steel is meant in particular a steel that is naturally hard, drawn, hardened or, respectively, tempered. Useful wall thicknesses for shell parts of this type advantageously lie in a range of 0.1 to 0.5 mm. The diameter of the shell-shaped sheath MS1 is usually chosen to be in a range between 5 mm and 20 mm.

Figure 1:
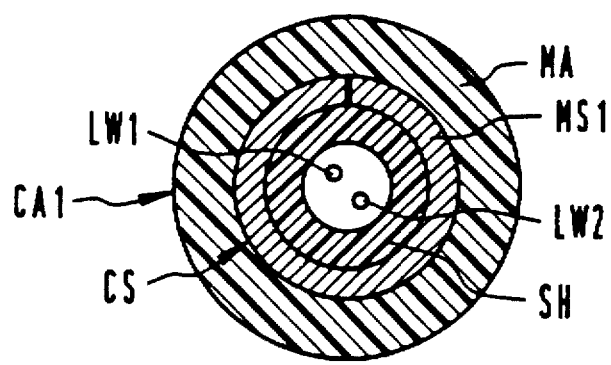
FIG. 1 is a transverse cross-sectional view of a cable with a shell part in accordance with a first embodiment of the present invention.
Figure 2:
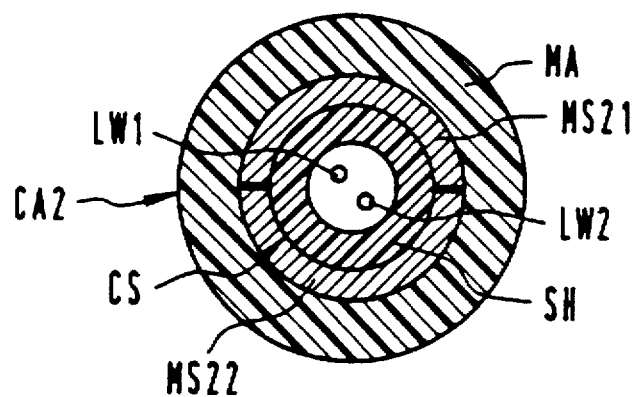
FIG. 2 is a transverse cross-sectional view of an embodiment of a cable having two shell parts in accordance with a second embodiment of the present invention.

FIG. 2 shows a modified cable CA2 whose elements are the same as those in the embodiment of FIG. 1 and have the same element numbers. Only the construction of the tubular sheath has been essentially changed and it consists of two shell parts MS21 and MS22 which are made of spring-hard steel and preferably have the same size and have a configuration which is chosen so that they lie flush on one another at their respective edges. If a further sealing should be necessary in regard to particularly high diffusion blocking values, each of the gaps can be closed, for example by the laying on of a thin metal foil.

Figure 3:
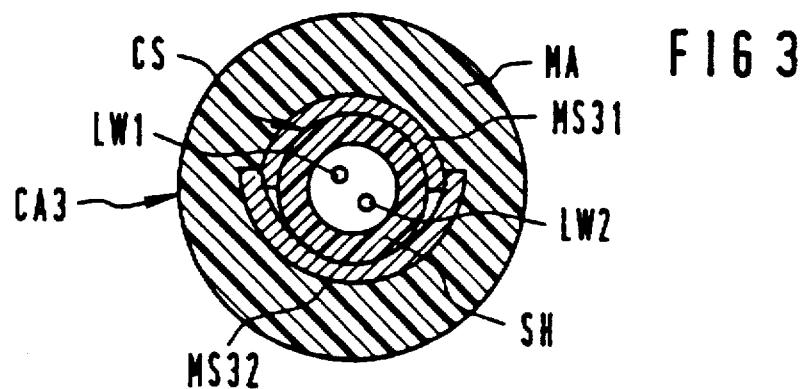
FIG. 3 is a transverse cross-sectional view of a cable having two overlapping shell parts in accordance with the third embodiment of the present invention.

A third embodiment is illustrated in FIG. 3 and is the modified optical cable CA3. Only the construction of the tubular sheath is essentially modified, and here consists of two shell parts MS31 and MS32 whose configuration is chosen so that the parts MS31 and MS32 partially overlap in their edge areas. This not only yields a higher diffusion strength, but also a construction that is mechanically more rigid overall, and is particularly secure against buckling.

Figure 4:
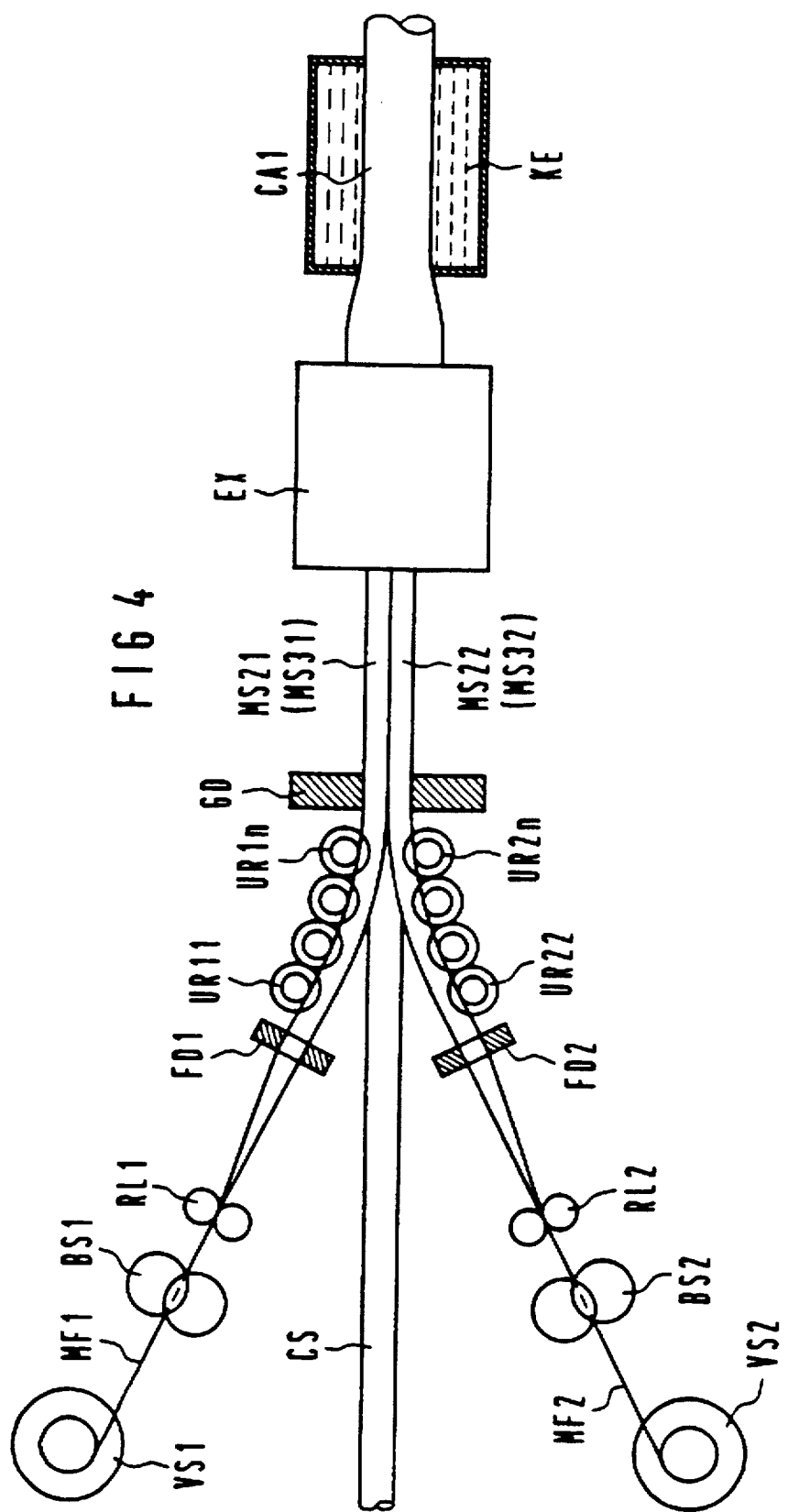
FIG. 4 is a schematic representation of an apparatus for manufacturing a cable according to the invention.

To manufacture a cable such as the cable CA2 of FIG. 2 or CA3 of FIG. 3, an apparatus illustrated in FIG. 4 is provided. This apparatus includes two supply coils VS1 and VS2, on which are wound spring-hard steel flat strips MF1 and MF2 respectively. If the width of these spring-hard steel strips MF1 and MF2 does not correspond to the desired requirements, a cutting apparatus or strip slitter BS1 or BS2 is provided in order to obtain the desired width.

The forward transport or, respectively, the drawing back of the flat strips MF1 and MF2 is obtained by one or more guide rollers RL1, RL2. These strips are subsequently supplied respectively to a forming nozzle FD1 and FD2 respectively having one or several stages whose stages preferably are circular opening passages with a diameter chosen to be smaller than the width of the flat strips MF1 and MF2, so that these strips are transformed into a shell-shaped formations. During this process of transformation, the limit of elasticity of the spring-hard strip material is exceeded, and a permanent deformation of the steel strips is achieved, so that overall a bow-shaped, preferably a half-shell-shaped structure with a semi-circular cross-section is obtained. In the construction of the nozzle opening of the forming nozzles FD1 and FD2, the subsequent spring back is to be taken into account, i.e. the nozzles are to be chosen to be correspondingly smaller in their opening passage than the width or radius later desired for each of the shell parts MS21 and MS22 or the parts MS31, MS32. In general, the elastic expansion of the order of a few millimeters in diameter must be allowed for this elastic spring back.

The attaching of the shell-shaped partial bows formed in this way to the cable core CS running from the left to right occurs by means of at least one guide nozzle GD, whose diameter corresponds approximately equally to the outer diameter of the finished desired steel sheath of the cable. In order to support the pressure of the steel shells on the cable core, several deflection rollers UR11-UR1n for the shell part MS21 or, UR21-UR2n for the shell part MS22 are usefully provided with a contour for their periphery so as to correspond to the curvature of the shell parts. The roller profiles are to be chosen to be equal, usefully of the width of the elastically expanded shell parts.

The represented manufacturing means serves for the manufacture of a cable according to FIG. 2, i.e. the two sub-shells MS21 and MS22 are pressed against one another with their edges abutting.

The running axles of the deflecting rollers UR11 through UR1n, as well as UR21 through UR2n are usefully arranged and are approximately bow shape, in order to ensure the necessary structuring of the shell parts. A run-in angle between the axis of the cable core CS and the supply direction of the shell parts MS21 and MS22 should be chosen as small as possible and usefully be in a range between 0° and 5°.

If a cable is to be manufactured according to the cable CA3 of FIG. 3, the forming nozzles FD1 and FD2, as well as, if warranted, the rollers UR11 through UR1n on one side and UR21 through UR2n on the other side are to be dimensioned correspondingly different. For example, the forming nozzles FD2 and the deflection rollers UR21 through UR2n receive a broader profile than the forming nozzle FD1 and the deflection rollers UR11 through UR1n.

For manufacturing a cable CA3 of FIG. 3, it is also possible to proceed so that both shell parts MS31 and MS32 are manufactured with approximately the same size at first for each half shell. Upon a supply of half shells MS32, which sits on the exterior, a brief elastic widening of the half shell MS32 without a permanent plastic deformation can be obtained after the last deflecting roller UR2n by means of a corresponding forming shoe constructed with an approximately half-shell shape, so that this half shell MS32 then elastically expands on the outer surface of the shell part MS31 supplied from above and yields a good seal.

If a cable CA1 of FIG. 1 is to be manufactured with a one-part tubular sheath formed approximately into a closed C, only one forming nozzle, i.e., FD1 is to be provided which produces a closed C profile from the flat metal strip MF1. By means of a corresponding expanding shoe, this closed C profile is then briefly opened for the introduction of the cable core CS with the amount of opening being a spring-elastic expansion. From this expanded position, the C profile then is attached to the cable core as snugly as possible by springing back to the closed position.

The steel strips MF1, MF2 are formed by the forming nozzles FD1, FD2 in such a way that the inner diameter of the formed shells overall is chosen equal to or smaller than the outer diameter of the cable core CS.

The cable core CS, which is provided with a metallic sheath, is supplied to one or several extruders EX, by means of which an outer coating MA having one layer or several layers can be attached, so that as an end result the finished cable CA2 is obtained. Following the extruder is a cooling means KE. If the coating MA is a plurality of layers, one of the layers, preferably the first one applied, can advantageously be a hot- melt adhesive, so that a non-positive connection occurs between the steel sheath and the coating MA. In this way, the mechanical characteristics and the diffusion characteristics are improved.

Although various minor modifications may be suggested by those skilled in the art, it should be understood that we wish to embody within the scope of the patent granted hereon on all such modifications as reasonably and properly come within the scope of our contribution to the art.

I claim as my invention:

1. A cable comprising a cable core, a sheath made of steel formed into a tube surrounding the cable core, and an outer coating surrounding the sheath, the improvement comprising the sheath consisting of two shell parts formed from spring steel strips.

2. In a cable according to claim 1, wherein each of the two shell parts is set so as to abut the edges of one another.

3. In a cable according to claim 1, wherein the two shell parts are arranged with overlapping edges.

4. In a cable according to claim 1, wherein the shell parts consist of respectively equally sized shell halves.

5. In a cable according to claim 1, wherein the sheath has a wall thickness in a range of 0.1 mm to 0.5 mm.

6. In a cable according to claim 1, wherein the outer coating is a plastic material and edges of the steel strip are free of weld connections.

7. A cable according to claim 1, wherein the spring steel strips have an elastic limit of about 600N/mm$^2$.

8. In a cable having a cable core surrounded by a sheath made of steel and formed into a tube, the improvement comprising the sheath consisting of two shell parts formed from spring steel strips.

9. In a cable according to claim 8, wherein each of the two shell parts is set so as to abut the edges of one another.

10. In a cable according to claim 8, wherein the two shell parts are arranged with overlapping edges.

11. In a cable according to claim 8, wherein the shell parts consist of respectively equally sized shell halves.

* * * * *